United States Patent
Hunter et al.

[11] Patent Number: 5,645,400
[45] Date of Patent: Jul. 8, 1997

[54] COMPOSITE CUFF STRUCTURE FOR HELICOPTER ROTORS

[75] Inventors: David H. Hunter, Cheshire; Karl B. Scherer, Stratford, both of Conn.

[73] Assignee: Sikorsky Aircraft Corporation, Stratford, Conn.

[21] Appl. No.: 617,012

[22] Filed: Mar. 18, 1996

[51] Int. Cl.$^6$ .......................... B64C 27/37; B64C 27/35
[52] U.S. Cl. .................. 416/134 A; 416/141; 416/230; 416/244 R
[58] Field of Search .................. 416/134 A, 138, 416/141, 230, 244 R

[56] References Cited

U.S. PATENT DOCUMENTS

| | | |
|---|---|---|
| 3,761,199 | 9/1973 | Ferris et al. . |
| 4,235,570 | 11/1980 | Ferris et al. . |
| 4,568,245 | 2/1986 | Hibyan et al. . |
| 4,592,701 | 6/1986 | Hahn et al. ........................ 416/134 A |
| 4,797,064 | 1/1989 | Ferris et al. . |
| 4,930,983 | 6/1990 | Byrnes et al. . |
| 5,059,094 | 10/1991 | Robinson et al. .................. 416/134 A |
| 5,562,416 | 10/1996 | Schmaling et al. ................ 416/134 A |

Primary Examiner—Edward K. Look
Assistant Examiner—Christopher Verdier
Attorney, Agent, or Firm—Brian A. Collins

[57] ABSTRACT

A composite cuff structure (40) for mounting the root end (14e) of a rotor blade assembly (14) to the radial arms (24a, 24b) of a rotor assembly yoke (24) and for accommodating a twist disparity therebetween. The composite cuff structure (40) is generally tubular in shape and is fabricated from a composite material having reinforcing fibers (70) disposed in a binding matrix. The composite cuff structure (40), furthermore, includes a blade-receiving sleeve portion (42), a yoke mounting portion (44), spanwise fold portions (46) and sidelobe portions (48), which portions (42, 44, 46, 48) are structurally integrated to form a unitary body. The blade-receiving sleeve portion (42) is disposed in combination with the root end (14e) of the rotor blade assembly (14) and includes first and second blade mounting segments (42a, 42b), which define a rotor blade attachment plane $P_B$. The yoke mounting portion (44) is disposed in combination with the radial arms (24a, 24b) of the rotor assembly yoke (24) and includes fore and aft pairs (44-1, 44-2) of first and second yoke mounting segments (44a, 44b) defining a yoke attachment plane $P_Y$. The pairs (44-1, 44-2) of yoke mounting segments (44a, 44b) are, furthermore, disposed laterally of the blade mounting segments (42a, 42b). The spanwise fold portions (46) include first and second complementary curve segments (46a, 46b) for structurally interconnecting the blade and yoke mounting segments (42a, 42b, 44a, 44b) such that the rotor blade attachment plane $P_B$ forms an angle θ with respect to the yoke attachment plane $P_Y$. The sidelobe portions (48) include fore and aft curved segments (48a, 48b) for structurally interconnecting the first and second yoke mounting segments (44a, 44b).

19 Claims, 4 Drawing Sheets

COMPOSITE CUFF STRUCTURE FOR HELICOPTER ROTORS

TECHNICAL FIELD

This invention is directed to composite cuff structures for mounting a helicopter rotor blade assembly to a rotor hub assembly, and, more particularly, to a composite cuff structure for accommodating a twist disparity between the root end of the rotor blade assembly and a rotor assembly yoke.

BACKGROUND OF THE INVENTION

A helicopter rotor hub is the primary structural assembly for driving torque to and reacting the centrifugal loads of each rotor blade and transferring lift loads thereof to the aircraft fuselage. Common varieties of rotor hubs include articulated, hingeless and bearingless types wherein the rotor hub is characterized by the specific means for accommodating the multi-directional displacement of the rotor blades. For example, articulated rotor hubs typically employ one or more bearing elements to accommodate rotor blade excursions whereas bearingless rotor hubs utilize flexible structures, commonly termed "flexbeams", to functionally replace the bearing elements of articulated rotor hubs.

Within the class or category of articulated rotors are those which include a central hub member for driving a plurality of rotor blade assemblies via spherical multi-laminate elastomeric bearings. More specifically, the hub member includes a plurality of radial spokes and shear segments which structurally interconnect a pair of radial spokes. Each shear segment, in combination with its respective pair of spokes, forms a structural loop which, depending upon the configuration of the hub member, may be vertically or horizontally oriented. Each structural loop accepts a rotor assembly yoke which is generally C-shaped and circumscribes, in looped fashion, the shear segments of the hub member. The rotor assembly yoke includes a midsection, which extends though the respective structural loop, and a pair of radial arms which are disposed on either side of the shear segment. The proximal ends of the yoke arms mount to the root end of the respective rotor blade or, alternatively, to an intermediate cuff structure. A spherical elastomeric bearing comprised of alternating layers of elastomer and nonresilient shims is interposed between the midsection of each yoke and the shear segment to accommodate the loads and motions of the associated rotor blade.

Centrifugal forces are transferred to the hub member as a compressive load in the elastomeric bearing, i.e., as the yoke bears against the innermost bearing endplate of the elastomeric bearing. The spherical configuration of the elastomeric bearing accommodates the transmission of torque to the rotor blade, provides for the transmission of lift loads to the rotor hub and, accommodates the in-plane (edgewise), out-of-plane (flapwise) and pitch change (feathering) motion of the rotor blade. U.S. Pat. Nos. 3,761,199, 4,235,570, 4,568,245, 4,797,064, and 4,930,983 illustrate articulated rotors of the type described above and are generally indicative of the current state-of-the art.

The arrangement for mounting the rotor blade assembly to the rotor hub assembly, i.e., the root end of the rotor blade to the rotor assembly yoke, often requires that a twist disparity therebetween be reconciled. Such twist disparity arises inasmuch as the mounting lugs/clevis arms of the rotor yoke are typically oriented in a horizontal plane while the root end of the rotor blade is typically canted with respect thereto. With respect to the latter, it is generally advantageous to effect a high angle of attack at the inboard section of a rotor blade for maximizing lift and generating a uniform downwash. Depending upon the desired aerodynamic properties the rotor blade assembly, the inboard angle of attack may exceed 20 degrees relative to the rotor assembly yoke.

Prior art mounting arrangements typically reconcile the twist disparity by means of an intermediate metallic cuff structure wherein the flanges thereof are canted with respect to the inboard lugs/clevis arms. While such cuff structures are readily fabricated from metallic materials having substantially isotropic strength properties, the complex geometry thereof does not facilitate fabrication utilizing composite materials, i.e., fiber reinforced resin matrix materials, wherein strength thereof is highly directional. It will be appreciated that manufacturing difficulties arise when attempting to arrange the fibers in the proper orientation to accommodate the various load paths through the cuff structure.

Other mounting arrangements for accommodating the twist disparity include the formation of a twist reversal at the rotor blade root end such that the blade lugs/clevis arms are coplanar with those of the rotor assembly yoke. While such mounting arrangements eliminate the requirement for an intermediate cuff structure and obviate the attendant weight penalties associated therewith, the twist reversal complicates the tooling employed in the fabrication of the blade assembly and creates difficulties associated with optimally orienting the fiber reinforcement thereof for optimum structural efficiency. With regard to the former, the introduction of twist in the fabrication of a composite tubular structure such as a rotor blade often requires the use of multi-element tooling, i.e., mandrel assemblies, to obviate internal tool lock caused by the twist geometry of the rotor blade. With regard to the latter, optimum fiber orientation is difficult to achieve when laying composite plies over a complex curvature mold or mandrel such as that required by the reversed twist geometry. This problem is more pronounced when employing low cost composite manufacturing methods, e.g., hand lay-up of composite plies, wherein the fiber orientation is caused to deviate from an optimum angle due to the complex curvature. For example, the complex curvature will cause spanwise unidirectional fibers, which are typically desirable for reacting axial and bending loads, i.e., centrifugal and flapwise/edgewise bending loads, to be "off-axis" with respect to the direction of the load vector.

In addition to the manufacturing difficulties discussed above, the twist reversal also degrades aerodynamic performance of the rotor blade assembly. Insofar as such reversed twist typically occurs over a spanwise length of about 3% to 5%, it will be appreciated that the reduced angle of attack along such length degrades the overall aerodynamic performance of the rotor blade assembly.

A need therefore exists for providing a cuff structure for accommodating the twist disparity between the root end of the rotor blade assembly and the rotor assembly yoke without degrading the aerodynamic performance of the rotor blade assembly, and which avoids tooling complexity and facilitates fabrication via low-cost manufacture methods.

SUMMARY OF THE INVENTION

It is an object of the present invention to provide a composite cuff structure having a unique geometric shape for accepting and mounting to the root end of a rotor blade assembly and to a rotor assembly yoke, which geometric shape, furthermore, accommodates a twist disparity between the rotor blade and the rotor assembly yoke.

It is yet another object of the invention to provide a composite cuff structure wherein the geometric shape thereof facilitates fabrication via low cost manufacturing methods without adversely effecting the orientation of the structural fibers employed therein.

It is still a further object of the present invention to provide such a composite cuff structure wherein the geometric shape thereof accommodates twist disparity without adversely affecting the aerodynamic performance of the rotor blade assembly.

It is yet a further object of the present invention to provide such a composite cuff structure wherein regions thereof are structurally softened to more uniformly distribute interlaminar shear and peal stresses therein.

These and other objects are achieved by a composite cuff structure having a generally tubular shape and fabricated from a composite material having reinforcing fibers disposed in a binding matrix. The composite cuff structure includes a blade-receiving sleeve portion, a yoke mounting portion, spanwise fold portions and sidelobe portions, which portions are structurally integrated to form a unitary body. The blade-receiving sleeve portion is disposed in combination with the root end of a rotor blade assembly and includes first and second blade mounting segments which define a rotor blade attachment plane $P_B$. The yoke mounting portion is disposed in combination with the radial arms of a rotor assembly yoke and includes fore and aft pairs of first and second yoke mounting segments defining a yoke attachment plane $P_Y$. The pairs of the yoke mounting segments are, furthermore, disposed laterally of the blade mounting segments. The spanwise fold portions include first and second complementary curve segments for structurally interconnecting the blade and yoke mounting segments such that the rotor blade attachment plane $P_B$ forms an angle θ with respect to the yoke attachment plane $P_Y$. The sidelobe portions include fore and aft curved segments for structurally interconnecting the first and second yoke mounting segments.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 2b is a cross-sectional view taken substantially along line 2b–2b of FIG. 2a;

FIG. 2c is a cross-sectional view taken substantially along line 2c—2c of FIG. 2a;

FIGS. 4b is a cross-sectional view taken substantially along line 4b—4b of FIG. 2a.

BEST MODE FOR CARRYING OUT THE INVENTION

Figure 1:
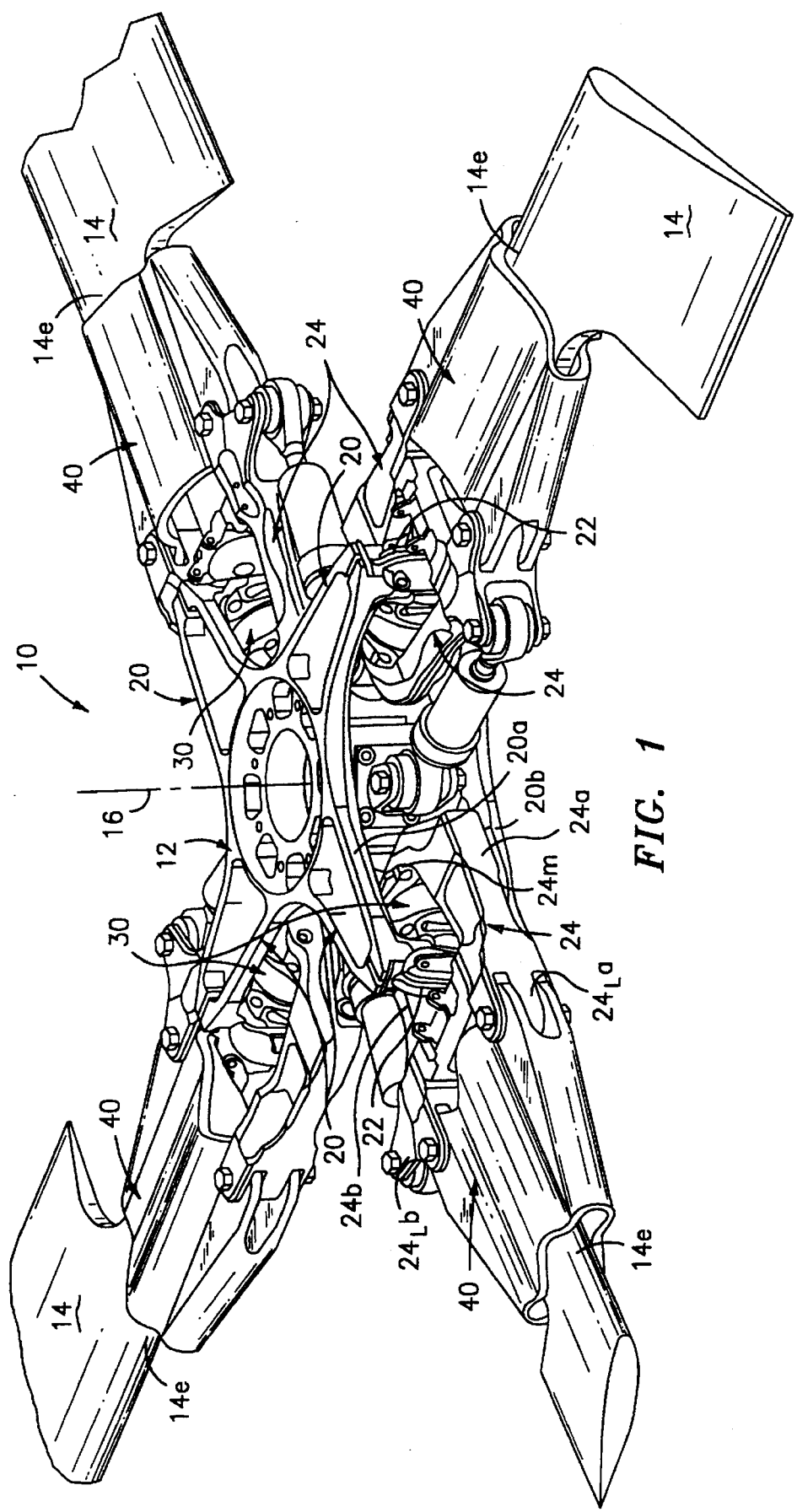
FIG. 1 depicts a perspective view of an articulated rotor hub assembly wherein composite cuff structures according to the present invention are disposed in combination with rotor assembly yokes and a root end portion of each rotor blade assembly.

Referring now to the drawings wherein like reference characters identify corresponding or similar elements throughout the several views, FIG. 1 depicts a rotor hub assembly 10 including a hub retention member 12 operative for driving a plurality of rotor blade assemblies 14 about an axis of rotation 16. The hub retention member 12 includes a plurality of radial spokes 20 and shear segments 22 which structurally interconnect pairs of radial spokes, i.e., upper and lower radial spokes, 20a, and 20b, respectively. Each shear segment 22, in combination with its respective radial spokes 20, forms a structural loop for accepting a rotor assembly yoke 24. The rotor assembly yoke 24 is generally C-shaped and circumscribes, in looped fashion, the respective shear segment 22. More specifically, the rotor assembly yoke 24 includes a midsection 24m, which extends through the respective structural loop, and a pair of radial arms 24a, 24b which project outwardly of the midsection 24m and to either side of the shear segments 22. Interposed between the midsection of the yoke 24 and the respective shear segment 22 is an axisymmetric elastomeric bearing assembly 30 which accommodates multidirectional displacement of the respective rotor blade assembly. Such elastomeric bearing assembly 30 is more fully described in a commonly owned, co-pending patent application 08/617,458, entitled "Axisymmetric Elastomeric Bearing Assembly for Helicopter Rotors".

A composite cuff structure 40 according to the present invention is disposed in combination with the radial arms 24a, 24b of each rotor assembly yoke 24 and to the root end 14e of each rotor blade assembly 14 and is configured to accommodate a twist disparity therebetween. As discussed in the Background of the Invention, such twist disparity arises due to the desired angle of attack at the root end 14e of the rotor blade assembly 14 and the substantially horizontal orientation of the rotor assembly yoke 40. As used herein, twist disparity is defined as the difference in angular orientation of the root end 14e of the rotor blade assembly 14 with respect to the radial arms 24a, 24b of the rotor assembly 24, and more specifically, with respect to the mounting lugs thereof.

Figure 2A:
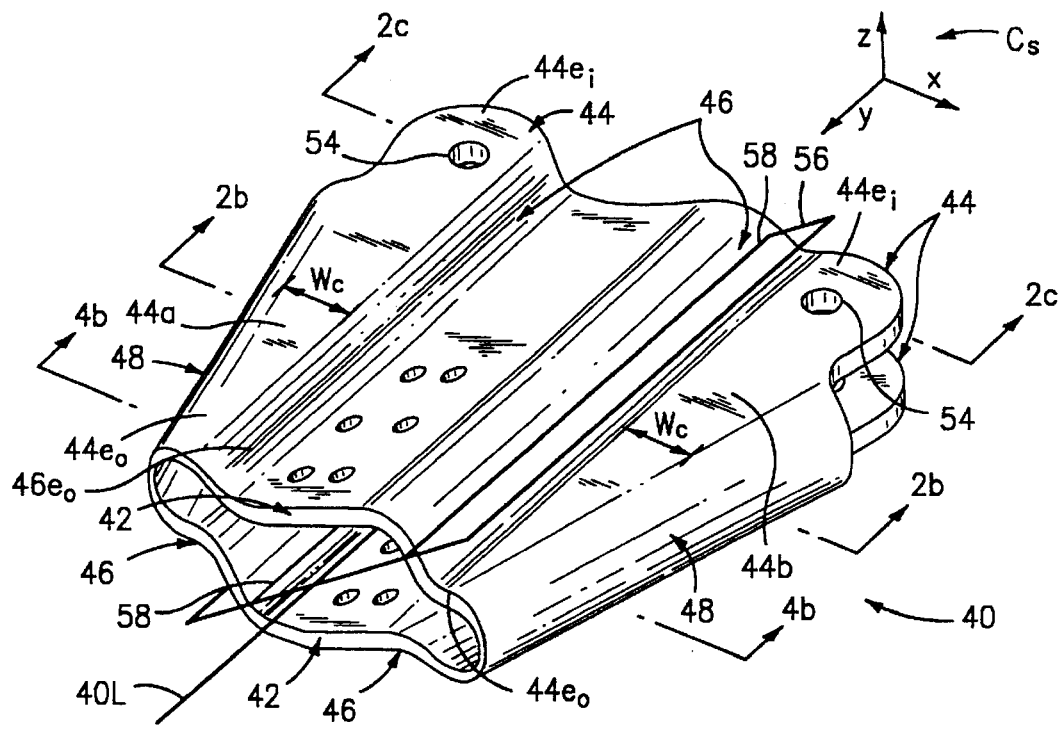
FIG. 2a is an isolated perspective view of the composite cuff structure in accordance with the present invention wherein various portions and segments of the composite cuff structure are identified.

To facilitate the description, the composite cuff structure 40 is defined in terms of various portions and segments thereof which have specific structural and functional characteristics. However, it will be understood that the adjacent portions or segments thereof, are structurally interconnected to define a unitary body. In FIG. 2a, a Cartesian coordinate system $C_S$ serves as frame of reference for defining the geometric shape of the cuff structure 40 wherein the longitudinal axis $40_L$ of the cuff structure 40 lies in a horizontal x-y plane of the coordinate system and wherein the z-axis is normal and vertically oriented with respect thereto.

Figure 2B:
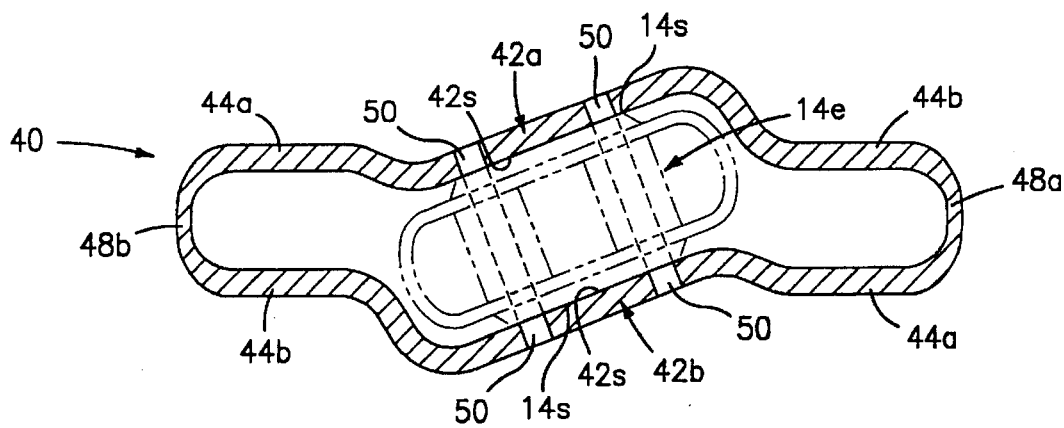

In FIGS. 2a and 2b, the composite cuff structure 40 is generally tubular in shape and includes a blade-receiving sleeve portion 42, a yoke receiving portion 44, spanwise fold portions 46, and sidelobe portions 48. More specifically, the blade-receiving sleeve portion 42 is defined by first and second blade mounting segments 42a and 42b, respectively, which further define inner surfaces 42s for accepting the upper and lower mounting surfaces 14s of the rotor blade root end 14e (shown in fantom). Mounting apertures 50 are formed through the blade mounting segments 42a, 42b for accepting connecting bolts (not shown) which fasten the rotor blade root end 14e to the composite cuff structure 40.

Figure 2C:
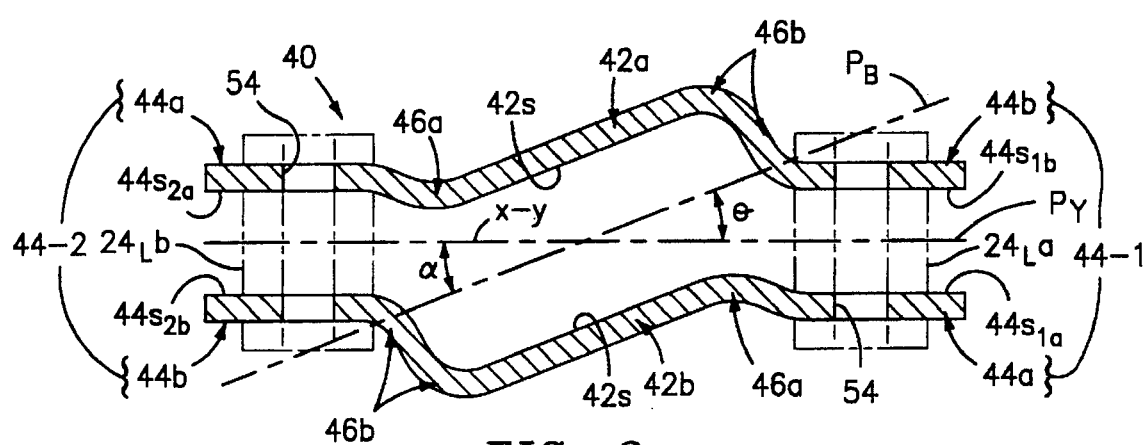

In FIGS. 2a and 2c, the yoke receiving portion 44 is defined by fore and aft pairs 44-1, 44-2 of first and second yoke mounting segments 44a, 44b, which pairs 44-1, 44-2 are disposed laterally of the blade mounting segments 42a, 42b. Each pair 44-1, 44-2 of first and second mounting segments 44a, 44b accepts the mounting lugs $24_La$, $24_Lb$ (shown in fantom) of the rotor assembly yoke. Mounting apertures 54 are formed at the inboard ends $44e_i$ of the yoke mounting segments 44a, 44b for accepting connecting bolts (not shown) which fasten the composite cuff structure 40 to the rotor assembly yoke. Preferably, the first and second yoke mounting segments 44a, 44b taper in chordwise width dimension $W_c$ from an inboard end $44e_i$ to an outboard end $44e_o$ thereof.

The inner surfaces 42s of the blade-mounting segments 42a, 42b, in combination, define a blade attachment plane $P_B$ which forms an angle α with respect to the x-y plane. The angle θ corresponds to the desired root-end angle of attack of the rotor blade assembly 14. In the preferred embodiment, the inner surfaces 42s are substantially parallel, though, the inner surfaces 42s may be adapted (in shape) to conform to the contour of the upper and lower surfaces 14s of the rotor blade assembly 14. While the shape of the inner surfaces 42s is dependent upon the contour of the rotor blade root end 14e, it is essential that the resultant angular orientation of the combined inner surfaces 42s define, i.e., fix in space, a blade attachment plane $P_B$ as described above.

The inner surfaces $44s_{1a}$–$44s_{2b}$ of the yoke mounting segments 44a, 44b, in combination, define a yoke attachment plane $P_Y$ which is substantially co-planar with respect to the x-y plane. In the context used herein, substantially co-planar means within ±4 degrees of the x-y plane and corresponds to the desired orientation of the mounting lugs $24_La$, $24_Lb$ of the rotor assembly yoke. In the preferred embodiment, the inner surfaces $44s_{1a}$–$44s_{2b}$ of the yoke mounting segments 44a, 44b are substantially parallel, and the corresponding inner surfaces $44s_{1a}$, $44s_{2b}$ and $44s_{1b}$, $44s_{2a}$ of the first and second yoke mounting segments 44a, 44b are substantially coplanar. However, it will be appreciated that the parallel and/or co-planar relationships of the inner surfaces $44s_{1a}$–$44s_{2b}$ may differ depending upon the mounting lug configuration. While the specific geometry of the inner surfaces $44s_{1a}$–$44s_{2b}$ is configuration dependent, it is essential that the resultant angular orientation of the combined inner surfaces $44s_{1a}$–$44s_{2b}$ define, i.e., fix in space, a yoke attachment plane $P_Y$ as described above.

The spanwise fold portions 46 are defined by first and second complementary curve segments, 46a and 46b, respectively, which structurally interconnect the blade-receiving sleeve and yoke mounting portions 42, 44. Furthermore, the complementary curve segments 46a, 46b effect a geometric transition, i.e., angular change, from the blade mounting segments 42a, 42b to the yoke mounting segments 44a, 44b, such that an angle θ is formed between the rotor blade attachment plane $P_B$ and the yoke attachment plane $P_Y$. The angle θ formed by the planes $P_B$, $P_Y$ corresponds to the angular disparity, i.e., twist disparity, existing between the root end 14e of the rotor blade assembly and the radial arms 24a, 24b, of the rotor assembly yoke. For the described embodiment, the angle θ is between a range of about 4 degrees to about 30 degrees, which range represents the practical limits for the application described. That is, the twist disparity is typically less about 30 degrees and, for applications having a twist disparity less than about 4 degrees, other mounting arrangements, such as those described in the Background of the Invention, may provide an adequate solution to the problems addressed herein.

The sidelobe portions 48 are defined by fore and aft curved segments 48a and 48b, respectively, (see FIG. 2b) which may be semi-circular, semi-elliptical or parabolic in cross-section. Furthermore, the curved segments 48a, 48b structurally interconnect the first and second yoke mounting segments 44a, 44b and form shear webs for transferring loads thereacross.

In addition to the geometric characteristics described above, the blade and yoke mounting segments 42a, 42b, 44a, 44b, and the complementary curve segments 46a, 46b define a substantially constant inner mold line dimension from section to section along the longitudinal axis $40_L$ of the composite cuff structure 40. That is, a plane 56 (FIG. 2a) which is colinearly aligned with the longitudinal axis $40_L$ and intersects the inner surface of the segments 42a, 42b, 44a, 44b, 46a, 46b, defines a longitudinal mold line 58 which is substantially parallel to the longitudinal axis $40_L$. In the context used herein, the term "substantially constant" or "substantially parallel" means within typical manufacturing tolerances. The import of such substantially constant inner mold line dimension will become apparent in light of the subsequent discussion regarding the structural and manufacturing benefits derived from such geometry.

The composite cuff structure 40 is fabricated from fiber reinforced resin matrix materials, i.e., composite materials, such as graphite, fiberglass or aramid fibers disposed in an thermoset or thermoplastic binding matrix, e.g., a phenolic or synthetic resin matrix. The orientation of the composite fibers and the type of composite material, e.g., unidirectional, woven, etc., will vary depending upon the loading conditions and the selected lay-up procedure. In the preferred embodiment, a plurality of composite plies are stacked and arranged to form a quasi-isotropic lay-up wherein the fibers thereof are oriented at 0/±45/±90 degrees relative to the longitudinal axis $40_L$ of the composite cuff structure 40. This orientation is desirable for optimally reacting centrifugal and bending loads in the planar segments 42a, 42b, 44a, 44b of the blade-receiving sleeve and yoke mounting portions 42, 44, torsional shear loads in the spanwise fold portions 46, vertical shear loads across the sidelobe portions 48, and in-plane shear loads about the mounting apertures 50, 54.

Figure 3:
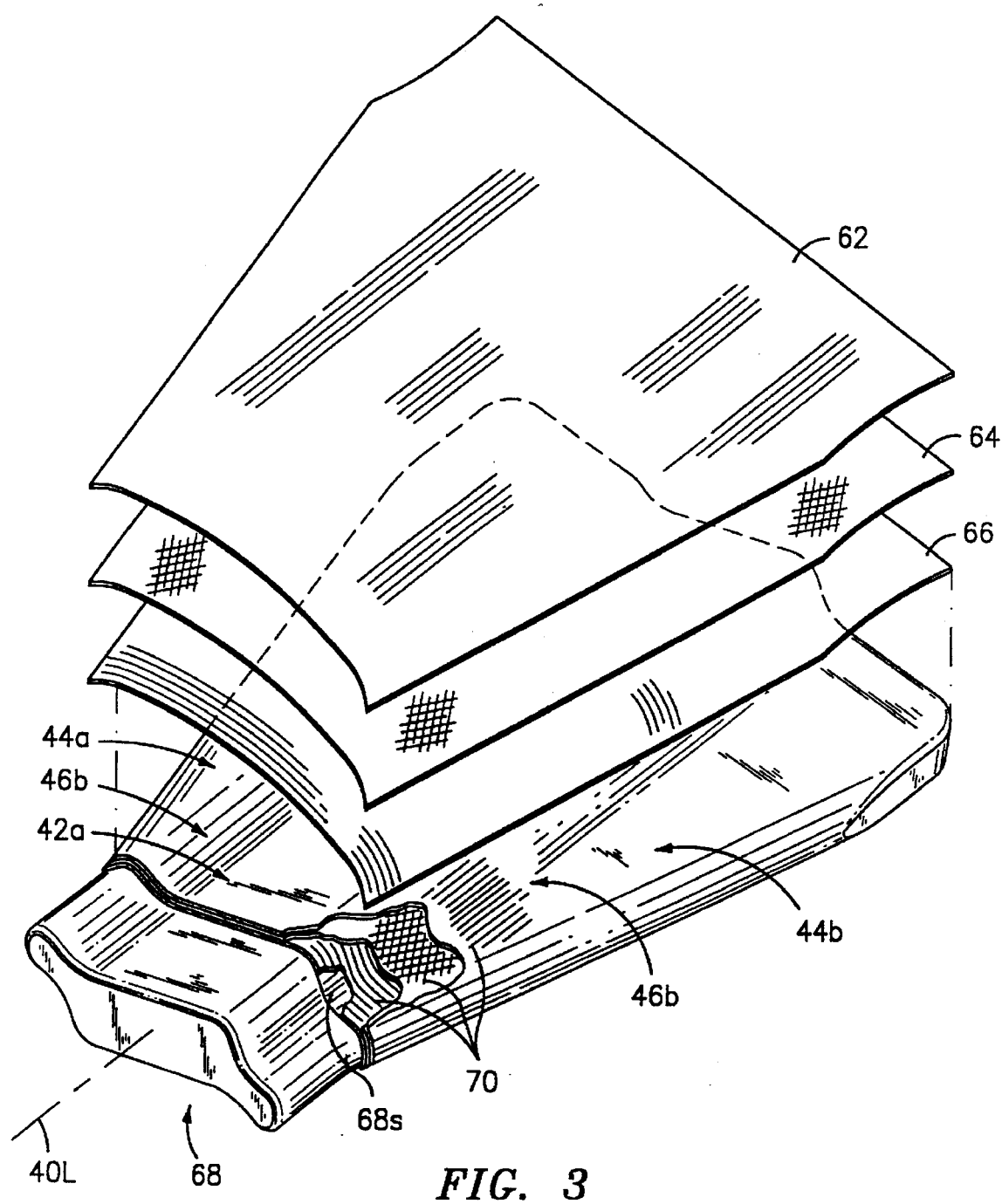
FIG. 3 is a perspective view of a mandrel assembly for fabricating the composite cuff structure and composite plies being draped over the mandrel assembly for fabricating the composite cuff structure.

The geometric configuration of the composite cuff structure 40 reconciles the twist disparity between the rotor blade assembly and the rotor assembly yoke while, furthermore, achieving the desired fiber orientation. In FIG. 3, unidirectional composite plies 62 and off-axis composite plies 64, 66, respectively, are laid over a mandrel assembly 68. The mandrel assembly 68 defines a mold surface 68s corresponding to the inner mold line surface of the composite cuff structure 40. The reference numbers used earlier to describe the composite cuff structure 40 are used to define the various segments of the mold surface 68s. The unidirectional and off-axis plies 62, 64, 66, in combination, form a quasi-isotropic lay-up wherein the fibers of the unidirectional plies 62 are substantially parallel to the longitudinal axis $40_L$ (0 degrees) and wherein the fibers of the off-axis plies 64, 66 are oriented at ±45/±90 degrees with respect the longitudinal axis $40_L$. Insofar as the longitudinal mold lines of the blade and yoke mounting segments 42a, 42b, 44a, 44b and, in particular, the complementary curve segments 46a, 46b, are substantially parallel to the longitudinal axis $40_L$, the plies 62, 64, 66 drape over the mold surface 68s without distorting or skewing the fibers 70. That is, the orientation of the fibers 70 remains substantially unaltered with respect to a top planar perspective such that the resulting fiber orientation is optimally suited for reacting the imposed loads. Furthermore, the substantially constant inner mold line dimension of the segments 42a, 42b, 44a, 44b, 46a, 46b, in combination with the tapered width dimension Wc of the first and second yoke mounting segments 44a, 44b, prevents tool lock and obviates the need for multi-element tooling.

In the described embodiment, the composite plies 62, 64, 66 are sequentially laid over the mandrel assembly 68, i.e., on both sides thereof, such that end portions thereof overlap in the areas corresponding to the side portions 48 of the composite cuff structure. Any conventional molding apparatus (not shown) may be employed for compacting and curing the composite lay-up. For example, an impervious membrane, i.e., vacuum bag, may be disposed over the mandrel assembly, sealed to the end portions thereof, and evacuated for applying compaction pressure to the lay-up. The entire assembly is then placed in an autoclave oven wherein heat and/or additional pressure is applied for curing the composite lay-up.

While the thickness of the composite laminate will vary depending upon the loading conditions, e.g., the centrifugal loads, flapwise and edgewise bending loads, torsional loads etc., the inventors discovered that certain structural benefits are derived by altering the thickness, and, consequently, the stiffness in various regions of the composite cuff structure 40. Moreover, such stiffness variations improve the structural efficiency thereof, thereby reducing the weight of the composite cuff structure 40.

Figure 4A:
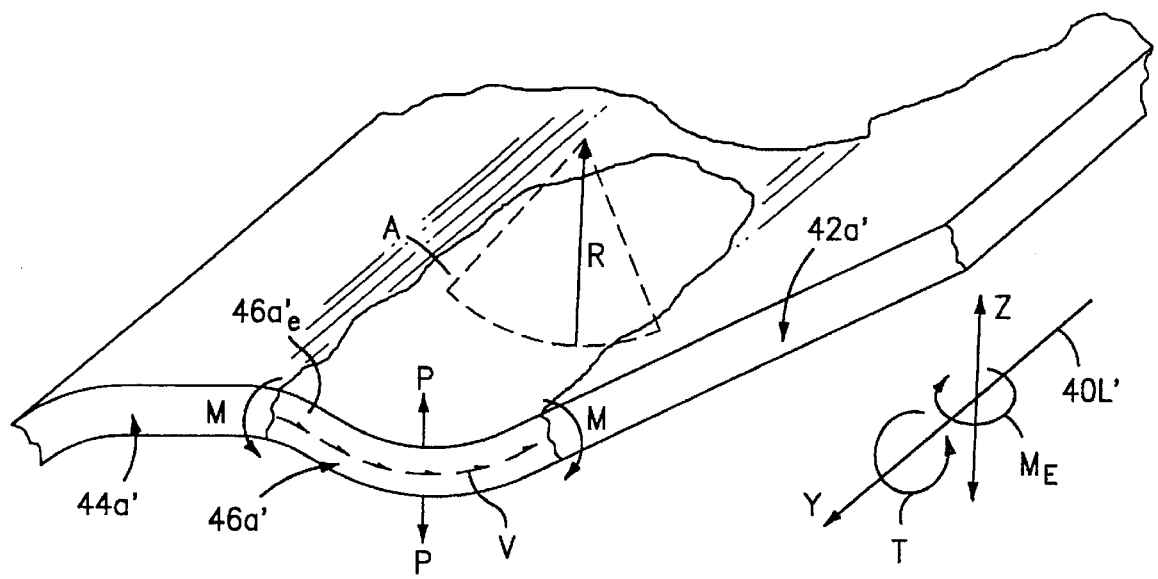
FIG. 4a depicts an upper aft segment of a first generation composite cuff structure wherein the various segments have a constant wall thickness.

FIG. 4a depicts an upper aft segment of a first generation composite cuff structure wherein the segments 42a', 44a' and 46a' corresponding to the blade mounting, yoke mounting and complementary curve segments, have a constant wall thickness. Structural analysis thereof revealed that, regions A corresponding to the complementary curve segments 46a' produced unacceptably high interlaminar shear V and peal stresses P in the composite laminate. More specifically, the highest shear and peal stresses V, P were produced in the outermost ends 46a'$_e$ of the complementary curve segments 46a' having a small radius of curvature R. Such high stresses V, P are developed principally as a result of lateral bending moment loads M produced by torsional loads T about the longitudinal axis 40$_L$' and edgewise bending moment loads M$_E$ about the vertical z-axis. While the conventional approach for reducing such stresses typically involves structural augmentation of the affected region A, i.e., stiffening the structure by thickening the laminate, the inventors discovered that by softening the complementary curve segment segments, stresses are more uniformly distributed in the composite cuff structure.

Figure 4B:
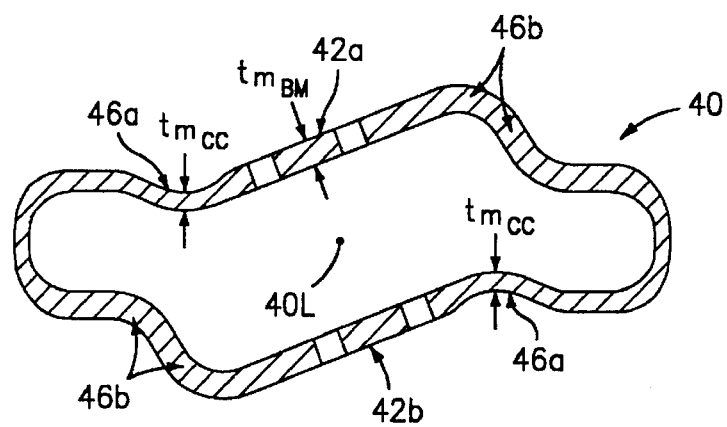

In FIG. 4b, the first complementary curve segments 46a having a small or acute radius of curvature are softened relative to their adjacent blade mounting segments 42a or 42b. That is, the characteristic stiffness $CS_{CC}$ of each first complementary curve segments 46a is less than the characteristic stiffness $CS_{BM}$ of its adjacent blade mounting segment 42a or 42b. The relationship may be further be expressed as follows:

CS of C. C. Segment=$E_{CC}(\frac{1}{12} b\, t_{mCC}^3) \leq E_{BM}(\frac{1}{12} b\, t_{mBM}^3)$=CS of B.M. Segment wherein E is the Young's modulus of the material in each segment, b is a unit length along the longitudinal axis 40$_L$, $t_{mCC}$ is the mean thickness of the complementary curve segment 46a, and $t_{mBM}$ is the mean thickness of the blade mounting segment 42a. Preferably, the characteristic stiffness of each first complementary curve segment 46a is between about 35% to about 75% of the characteristic stiffness of its adjacent blade mounting segment 42a or 42b.

More preferably, the characteristic stiffness of each first complementary curve segment 46a is reduced at the outboard ends thereof 46e$_o$ (see FIG. 2a), where the cuff structure 40 laminates terminate and the loads from the blade mounting segments 42a, 42b, are first introduced into the complementary curve segments 46a.

Such stiffness reduction is preferably achieved by reducing the mean thickness, i.e., from $t_{mBM}$ to $t_{mCC}$, of the composite laminate, but may, alternatively, be effected by altering the Young's modulus E of the laminate. Such modulus variations may be achieved by locally introducing plies of low modulus material such as fiberglass in the affected segments 46a, 46b, or by introducing plies wherein the fibers thereof are longitudinally biased, e.g., ±35 degrees relative to the longitudinal axis 40$_L$. The stiffness reduction in the complementary curve segments 46a causes the loads to be more uniformly distributed about the periphery of the composite cuff structure 40, i.e., to opposing sides thereof, and along the longitudinal length of the cuff structure 40.

While the described embodiment indicates that the stiffness reduction preferably occurs in the diagonally-situated first complementary curve segments 46a, it will be appreciated that any complementary curve segment 46a or 46b may be structurally softened to effect the desired redistribution of loads. The principle concern relates to the degree of curvature within the particular segment, rather than its location about the periphery of the composite cuff structure 40.

In accordance with the objectives of the invention, the composite cuff structure accommodates the twist disparity between the root end 14e of the rotor blade assembly and the radial arms 24a, 24b of the rotor assembly yoke while facilitating manufacture via a simple ply lay-up method. That is, the geometric shape of the composite cuff structure 40 facilitates composite manufacture via a ply lay-up technique without altering the desired orientation of the composite fibers. Additionally, the unique shape does not require complex multi-element tooling apparatus.

Furthermore, the composite cuff structure of the present invention permits the root end 14e of the rotor blade assembly 14 to maintain its desired inboard angle of attack without adversely impacting the aerodynamic performance of the rotor blade assembly 14. That is, the lift performance of rotor blade assembly 14 remains "effective", even when disposed in combination with the composite cuff structure 40. Moreover, the composite cuff structure 40 is aerodynamically shaped inasmuch as the cuff structure 40 presents a low aerodynamic profile with respect to the free-stream airflow.

Lastly, the composite cuff structure 40 is optimally stiffness-tailored for reducing interlaminar shear and peal stresses in the composite laminate. Such stiffness tailoring also improves the weight efficiency of the cuff structure.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A composite cuff structure (40) for mounting a root end (14e) of a rotor blade assembly (14) to radial arms (24a, 24b) of a rotor assembly yoke (24), the composite cuff structure (40) characterized by:

a unitary body having a generally tubular shape and including:

a blade-receiving sleeve portion (42) for being disposed in combination with the root end (14e) of the rotor blade assembly (14), said blade-receiving portion (42) having first and second blade mounting segments (42a, 42b) which define a rotor blade attachment plane $P_B$, a yoke mounting portion (44) for being disposed in combination with the radial arms (24a, 24b) of the rotor assembly yoke (24), said yoke mounting portion (44) having fore and aft pairs (44-1, 44-2) of first and second yoke mounting segments (44a, 44b), said pairs (44-1, 44-2) being disposed laterally of said blade mounting segments (42a, 42b), said yoke mounting segments (44a, 44b) defining a yoke attachment plane $P_Y$;

spanwise fold portions (46) having first and second complementary curve segments (46a, 46b) for structurally interconnecting said blade and yoke mounting segments (42a, 42b, 44a, 44b), such that said rotor blade attachment plane $P_B$ forms an angle θ with respect to said yoke attachment plane $P_Y$; and sidelobe portions (48) having fore and aft curved segments (48a, 48b) for structurally interconnecting said first and second yoke mounting segments (44a, 44b);

said unitary body, furthermore, being fabricated from a composite material having reinforcing fibers (70) disposed in a binding matrix.

2. The composite cuff structure (40) according to claim 1 wherein said angle θ is between about 4 degrees to about 30 degrees.

3. The composite cuff structure (40) according to claim 1 wherein said unitary body defines a longitudinal axis $(40_L)$; and
wherein said spanwise fold portions (46) define longitudinal contour lines (58) which are substantially parallel to said longitudinal axis $(40_L)$.

4. The composite cuff structure (40) according to claim 1 wherein said first and second blade mounting segments (42a, 42b) and said first and second complementary curve segments (46a, 46b) each have a characteristic stiffness, said characteristic stiffness of at least one of said complementary curve segments (46a or 46b) being less than said characteristic stiffness of an adjacent blade mounting segment (42a or 42b).

5. The composite cuff structure (40) according to claim 4 wherein said characteristic stiffness of said at least one said complementary curve segments (46a or 46b) is between about 35% to about 75% of said characteristic stiffness of said adjacent blade mounting segment (42a, 42b).

6. The composite cuff structure (40) according to claim 4 wherein said characteristic stiffness of each of said first complementary curve segments (46a) is less than said characteristic stiffness of said adjacent blade mounting segment (42a or 42b).

7. The composite cuff structure (40) according to claim 4 wherein said characteristic stiffness of an outboard end $(46e_o)$ of said at least one said complementary curve segments (46a or 46b) is between about 35% to about 75% of said characteristic stiffness of said adjacent blade mounting segment (42a, 42b).

8. The composite cuff structure (40) according to claim 3 wherein said composite material includes unidirectional and off-axis fibers (70), said unidirectional fibers (70) being substantially parallel to said longitudinal axis $(40_L)$.

9. The composite cuff structure (40) according to claim 8 wherein said off-axis fibers (70) are oriented at ±45/±90 degrees relative to said longitudinal axis $(40_L)$ to form a quasi-isotropic lay-up.

10. A composite cuff structure (40) for mounting a root end (14e) of a rotor blade assembly (14) to radial arms (24a, 24b) of a rotor assembly yoke (24), the composite cuff structure (40) characterized by:

a unitary body having a generally tubular shape and defining a longitudinal axis $(40_L)$, said unitary body including:

a blade-receiving sleeve portion (42) for being disposed in combination with the root end (14e) of the rotor blade assembly (14), said blade-receiving portion (42) having first and second blade mounting segments (42a, 42b) which define a rotor blade attachment plane $P_B$, a yoke mounting portion (44) for being disposed in combination with the radial arms (24a, 24b) of the rotor assembly yoke (24), said yoke mounting portion (44) having fore and aft pairs (44-1, 44-2) of first and second yoke mounting segments (44a, 44b), said pairs (44-1, 44-2) being disposed laterally of said blade mounting segments (42a, 42b), said yoke mounting segments (44a, 44b) defining a yoke attachment plane $P_Y$;

spanwise fold portions (46) having first and second complementary curve segments (46a, 46b) for structurally interconnecting said blade and yoke mounting segments (42a, 42b, 44a, 44b), such that said rotor blade attachment plane $P_B$ forms an angle θ with respect to said yoke attachment plane $P_Y$, said angle θ being between about 4 degrees to about 30 degrees with respect to said yoke attachment plane $P_Y$, said spanwise fold segments (46a, 46b), furthermore defining longitudinal mold lines (58), said longitudinal mold lines (58) being substantially parallel to said longitudinal axis $(40_L)$; and sidelobe portions (48) having fore and aft curved segments (48a, 48b) for structurally interconnecting said first and second yoke mounting segments (44a, 44b);

said unitary body, furthermore, being fabricated from a composite material having reinforcing fibers (70) disposed in a binding matrix.

11. A rotor hub assembly (10) having a rotor assembly yokes (24) for driving a plurality of rotor blades assemblies (14), the rotor blades assemblies (14) each having a root end (14e) for mounting to radial arms (24a, 24b) of each rotor assembly yoke, the root end portion (14e) and the respective radial arms (24a, 24b) having a twist disparity therebetween, said rotor hub assembly (10) being characterized by:

a composite cuff structure (40) for mounting in combination with the root end (14e) of each rotor blade assembly (14) and the radial arms (24a, 24b) of each rotor assembly yoke (24), each said composite cuff structure (40) defining a unitary body having a generally tubular shape, said unitary body including:

a blade-receiving sleeve portion (42) for being disposed in combination with the root end (14e) of the rotor blade assembly (14), said blade-receiving portion (42) having first and second blade mounting segments (42a, 42b) which define a rotor blade attachment plane $P_B$, a yoke mounting portion (44) for being disposed in combination with the radial arms (24a, 24b) of the rotor assembly yoke (24), said yoke mounting portion (44) having fore and aft pairs (44-1, 44-2) of first and second yoke mounting segments (44a, 44b), said pairs (44-1, 44-2) being disposed laterally of said blade mounting segments (42a, 42b), said yoke mounting segments (44a, 44b) defining a yoke attachment plane $P_Y$;

spanwise fold portions (46) having first and second complementary curve segments (46a, 46b) for structurally interconnecting said blade and yoke mounting segments (42a, 42b, 44a, 44b), such that said rotor blade attachment plane $P_B$ forms an angle $\theta$ with respect to said yoke attachment plane $P_Y$; and sidelobe portions (48) having fore and aft curved segments (48a, 48b) for structurally interconnecting said first and second yoke mounting segments (44a, 44b);

said unitary body, furthermore, being fabricated from a composite material having reinforcing fibers (70) disposed in a binding matrix.

12. The composite cuff structure (40) according to claim 11 wherein said angle $\theta$ is between about 4 degrees to about 30 degrees.

13. The composite cuff structure (40) according to claim 11 wherein said unitary body defines a longitudinal axis ($40_L$); and wherein said spanwise fold portions (46) define longitudinal contour lines (58) which are substantially parallel to said longitudinal axis ($40_L$).

14. The composite cuff structure (40) according to claim 11 wherein said first and second blade mounting segments (42a, 42b) and said first and second complementary curve segments (46a, 46b) each have a characteristic stiffness, said characteristic stiffness of at least one of said complementary curve segments (46a or 46b) being less than said characteristic stiffness of an adjacent blade mounting segment (42a or 42b).

15. The composite cuff structure (40) according to claim 14 wherein said characteristic stiffness of said at least one said complementary curve segments (46a or 46b) is between about 35% to about 75% of said characteristic stiffness of said adjacent blade mounting segment (42a, 42b).

16. The composite cuff structure (40) according to claim 14 wherein said characteristic stiffness of each of said first complementary curve segments (46a) is less than said characteristic stiffness of said adjacent blade mounting segment (42a or 42b).

17. The composite cuff structure (40) according to claim 14 wherein said characteristic stiffness of an outboard end ($46e_o$) of said at least one said complementary curve segments (46a or 46b) is between about 35% to about 75% of said characteristic stiffness of said adjacent blade mounting segment (42a, 42b).

18. The composite cuff structure according to claim 13 wherein said composite material includes unidirectional and off-axis fibers (70), said unidirectional fibers (70) being substantially parallel to said longitudinal axis ($40_L$).

19. The composite cuff structure according to claim 18 wherein said off-axis fibers (70) are oriented at ±45/±90 degrees relative to said longitudinal axis ($40_L$) to form a quasi-isotropic lay-up.

\* \* \* \* \*